Feb. 17, 1970        E. HAGOPIAN        3,495,999

PROCESS FOR AFTERTREATING CARBON BLACK

Filed Oct. 26, 1966

United States Patent Office 3,495,999
Patented Feb. 17, 1970

3,495,999
PROCESS FOR AFTERTREATING CARBON BLACK
Erivan Hagopian, Newton, Mass., assignor to Cabot Corporation, Boston, Mass., a corporation of Delaware
Filed Oct. 26, 1966, Ser. No. 589,617
Int. Cl. C09c 1/06; C09d 11/00, 11/02
U.S. Cl. 106—307                      6 Claims

ABSTRACT OF THE DISCLOSURE

A process for preparing aftertreated carbon black products which entails subjecting carbon black to fluid energy milling while simultaneously contacting said carbon black with ozone.

---

This invention relates to a process for aftertreating carbon black to modify the surface characteristics thereof. More particularly this invention relates to a novel and highly efficient method of oxidizing carbon black surface by ozonization and to the carbon blacks produced by the novel method.

The ozonization of carbon blacks is known in the art. Such ozonization is typically carried out for the purpose of making certain furnace blacks suitable for incorporation into ink vehicles such as high-grade lithographic inks, letterpress inks, carbon paper inks, and the like. A chief property of carbon black which ozonization—and other oxidizing treatments—affects is the so-called "flow" characteristic. This characteristic is an empirically-determined measure of flowability contributed to a standard ink formulation by a given black.

There are some processing conveniences attainable in the manufacture of an ozone-treated black which conveniences cannot be achieved in the production of other oxidized blacks. For example, corrosion problems are substantially reduced in an ozone-treating facility over those encountered in acid-treating facilities. Moreover, time and temperature control need not be maintained so carefully in an ozone-utilizing process because the reaction between carbon black and ozone is very rapid. Finally, the problems associated with the discharge of gaseous oxides into the atmosphere is entirely avoided when ozone is used as the oxidizing agent.

Nevertheless, ozone has a substantially high cost and is a relatively unstable corrosive gas. Thus there has been some reluctance among carbon black producers to adopt ozonization as a surface-treatment. Another drawback to the use of ozone has been the necessity of treating the black in the "fluffy" form. Fluffy carbon black is well known to present dust problems which, in addition to handling difficulties, are an inconvenience and annoyance to personnel.

It is an object of the present invention to provide a process for ozonating carbon black which is suitable for processing of a pelleted carbon black feed.

It is a further object of the invention to provide a process for ozonating carbon black which process achieves very high efficiency in utilization of ozone.

It is another object of the invention to provide carbon blacks capable of contributing superb properties to ink formulations.

Other objects of the invention will be obvious to those skilled in the art from the disclosure set forth hereinbelow.

The above objects have been achieved with a novel process wherein carbon black and an ozone-bearing gaseous stream are simultaneously fed into a comminuting apparatus. Apparatus such as those commonly known in the art as "fluid-energy" mills are the most convenient and advantageous for use in carrying out the process of the present invention.

In the specification and working examples, and in the accompanying drawings, are shown and described illustrative embodiments of the invention; modifications thereof are indicated, but it is to be understood that these are not intended to be exhaustive nor limiting of the invention, but on the contrary are given for the purposes of illustration in order that others skilled in the art may fully understand the invention and the manner of applying it in practical applications. The various objects, aspects and advantages of the present invention will be more fully understood from a consideration of the specification and working examples in conjunction with the accompanying drawings.

Figure 1:
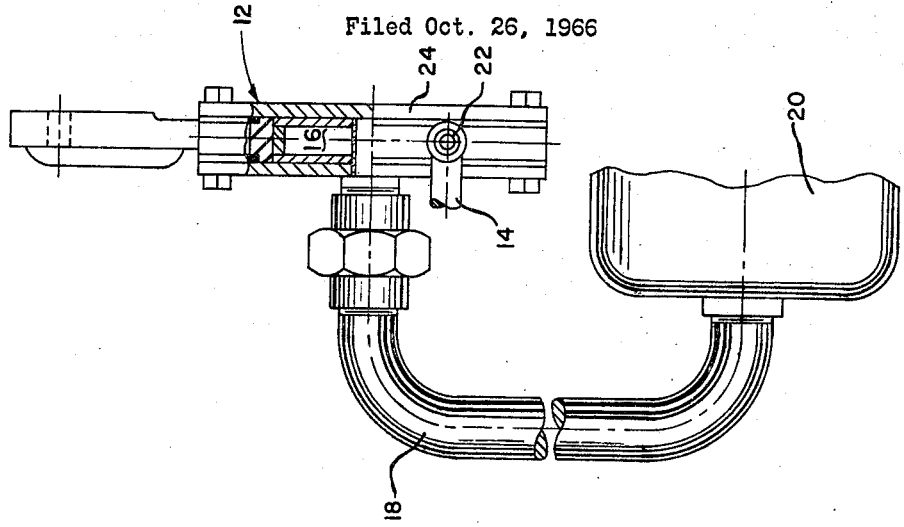
FIGURE 1 is a partial section in elevation of apparatus suitable for carrying out the process of the invention.
Figure 2:
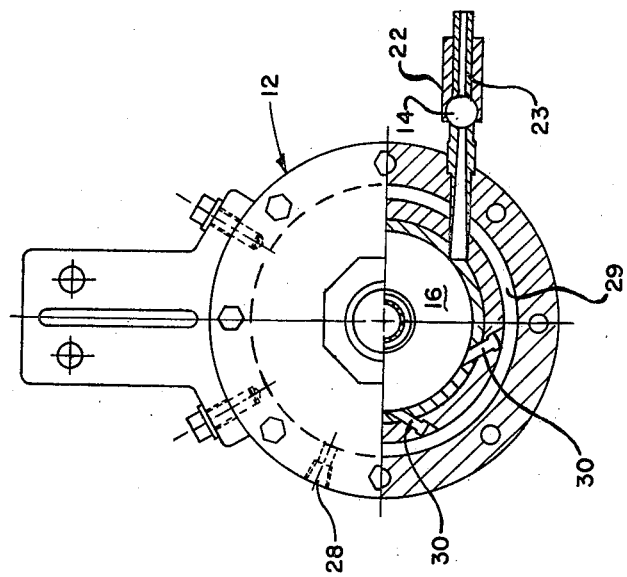
FIGURE 2 is a partial section in elevation of the apparatus shown in FIGURE 1 but taken normal to FIGURE 1.

Referring to the drawings, it is seen that a fluid energy mill 12 comprises a solids feed inlet pipe 14, a grinding chamber 16, and a product discharge line 18 attached to a product recovery unit 20. Feed inlet pipe 14 discharges into motive fluid inlet conduit 22. Conduit 22 comprises nozzle means 23 for obtaining very high velocities of fluids admitted thereto. Auxiliary motive fluid is admitted through port 28 for flow through annular passage 29 and into chamber 16 through tangentially-oriented nozzles 30. The high velocity motive fluid helps suck the solid feed into the apparatus and imparts to it the velocity required to achieve good grinding action.

The mill described is of the type sold under the tradename "Micronizer" by the Sturtevant Mill Co., Boston, Mass. and having a nominal 4-inch size of designation. Because the treated carbon black is taken out of the mill in fine particles and in a rather dilute stream of gas, it is more convenient to block off the normal outlet to a conventional collecting system by means of plate 24 and rely on the collection of product in the "overhead" collection system 20.

The motive fluid injected into chamber 16, may consist of any gas which will not interfere with the desirable completion of the reaction between carbon black and ozone. Air supplied at 100 p.s.i.g. is a suitable motive fluid. Steam may also be used, but at higher temperatures the particular treatment imparted to the carbon black will vary considerably. In practice, it is believed that very high motive fluid temperatures, for example, those approaching about 600° F. are not desirable.

Careful control over the rates of carbon black and ozone feed is desirable and can be used to control the degree of ozonization accomplished. Ratios of ozone to carbon black from about 0.005 to 1 to about 0.3 to 1, preferably of about 0.015 to 1, have proved effective for obtaining blacks having good ink properties. Of course, the optimum level of treatment depends on the particular carbonaceous raw material selected for ozonization and on the particular application to which the black treated is to be put.

Blacks prepared by the process of the invention are conveniently described by diphenylguanidine absorption and votalile content in respect to their surface areas. A brief description of tests determinative of these parameters is included herein:

The surface areas are obtained by a nitrogen absorption technique known in the art as the Brunnauer-Emmett-Teller technique.

Volatile content, related to the amount of oxygen chemisorbed on a black, is determined by heating the black to 950° C. and measuring the percent weight loss of the black.

The diphenylguanidine (DPG) absorption is also a measure of oxidized aftertreatment and has, for some purposes, proved to be the best single measure of the surface activity of carbon black. This test is carried out by shaking a one gram sample of carbon black for about thirty minutes in a 0.001 normal solution of diphenylguanidine in benzol. After shaking, the black is allowed to settle. The clear superatant solution is decanted off and titrated with a 0.002 N solution of hydrochloric acid in methanol to a bromophenol blue end point. This titration determines the amount of diphenylguanidine remaining in the benzol solution and, by difference, the amount of diphenylguanidine absorbed on the black.

Example 1

A high-abrasion furnace black (HAF black according to the older nomenclature or an N330 black according to the newer ASTM identification system) sold under the trade designation Vulcan 3 by Cabot Corporation was fed into a fluid energy mill at a rate of 3.4 lbs. per hour. This black was pelleted.

Into nozzle 22 was fed, at 98 p.s.i.g. and 80° F., 13.3 standard cubic feet per minute of air and 0.4 standard cubic feet of an ozone-bearing stream comprising 1.47 volume percent of ozone. About 26 standard cubic feet per minute of air was fed into port 28 for injection into chamber 26 through grinding jet nozzles 30. The pressure of air entering the grinding jets was about 72 p.s.i.g.

After 20 minutes the run was discontinued and the treated black was found to have the following modifications in properties:

|  | Before | After |
|---|---|---|
| Volatile, percent | 1.6 | 2.9 |
| Surface area, m.$^2$/gram | 62 | 63 |
| DPG absorption | 4.2 | 26.4 |
| pH | 8.3 | 4.2 |

In order to demonstrate the suitability of the instant process for making excellent ink-formulating pigments, a medium flow pigment of the type sold under the trade designation Regal 400R by Cabot Corporation (henceforth referred to as Black A) and a black prepared according to the process of the invention, henceforth referred to as Black B were compared with respect to their ink-related properties:

Example 2

A furnace carbon black to be converted into Black B was selected as follows:

Volatiles _____ 1.7
Surface area (meters$^2$ per gram) _____ 73
DPG absorption _____percent__ 4
Particle size (millimicrons) _____ 23

This carbon black was fed into a micronizer as described in Example 1. The rate of feed was 3.3 lbs. of black per hour. Oxygen-enriched air at about 75° F. was used as the motive fluid. As fed into the mill, it comprised 33.5 standard cubic feet per minute of gas and comprised 52% oxygen and 186 parts per million of ozone. The balance was nitrogen. The ozone carbon weight ratio was 0.014:1.

The analytical properties of the ozonated black were as follows:

Surface area _____ 74
Volatile percent _____ 2.4
DPG absorption _____percent__ 22

A careful analysis of the off-gas from the Micronizer and the increase in volatile content of the black confirmed that about 99% of the available oxygen from the ozone had reacted with the carbon black.

Preparation of ink formulations containing nitric-acid treated Black A and ozone-treated Black B was carried out by dispersing a mixture of 25% by weight of carbon black and 75% by weight of a linseed oil based vehicle known to Graphics Arts industry by the trade designation "Litho No. 1."

The two ink formulations were compared and the results appear in Table I below:

TABLE I

| Criterion | Black A | Black B |
|---|---|---|
| Dispersion: P. C. fineness | Good grind | Same quality as Black A. |
| Wet masstone: | | |
| Through glass | Good | Darker than A. |
| Through paper | do | Do. |
| Ink consistency | do | Better than A. |
| Tinting strength (drawdown on glossy paper) | do | Marginally better than A. |

The comparison set forth in Table I clearly indicates that not only are process advantages obtainable by use of the instant invention, but that surprising advantages are also attributable to the producs subjected to ozonation in a fluid energy mill.

The ozone may be obtained from any convenient source. However, it is usually most convenient to generate the ozone by use of a commercial ozone generator. Typically such generators will produce a stream containing from 1 to 2 weight percent of ozone, the rest of the stream being oxygen and nitrogen.

While applicant does not wish to be bound to any theory explanatory of the unexpected advantages achieved by the process of the invention, it is believed that the advantages of the process are related to the intimate mixing of ozone and black in the fluid energy mill and the breaking up of a substantial number of secondary agglomerates in the mill so that a large part of the carbon black surface is made available for immediate reaction with the ozone. A very rapid reaction rate between the carbon and ozone probably allows the completion of the desired reaction when it is carried out according to the invention, before a competing and undesirable reaction such as the catalytic decomposition of ozone to oxygen in the presence of carbon is able to take place.

The process of the invention is operable, convenient, and advantageous for ozonating any carbon black including furnace, channel, and thermal blacks. However, it is most promising for the preparation of carbon blacks useful in ink compounding. For such a purpose, furnace blacks having (a) volatile contents between about 1% and 5%, (b) surface areas between about 30 to 150 square meters per gram, (c) diphenylguanidine adsorptions between about 1 and 15 percent and (d) particle sizes between about 20 and 40 millimicrons, are highly advantageous for ozonization according to the invention.

What is claimed is:

1. A process for ozonating carbon black comprising (1) passing said carbon black through a grinding mill of the fluid-energy type and (2) simultaneously introducing ozone into said mill thereby bringing said ozone into intimate contact with said carbon black and accomplishing a chemical reaction therebetween.

2. A process as defined in claim 1 wherein said fluid-energy is imparted to said carbon black by a stream of compressed air.

3. A process as defined in claim 2 wherein said compressed air is enriched with oxygen.

4. A process as denefid in claim 1 wherein said carbon black is a pelletized furnace black.

5. A process as defined in claim 1 wherein said ozone is passed into said mill in a quantity equal to from about 0.5% to about 30% of the carbon black being treated therewith.

6. A process for ozonating furnace carbon black comprising continuously passing pellets of said carbon black through a grinding mill of the fluid energy type, simultaneously introducing from 0.5% to 30% of ozone based on the weight of said carbon black into said mill, and providing sufficient fluid to said mill to comminute said carbon black.

References Cited

UNITED STATES PATENTS

| | | | |
|---|---|---|---|
| 3,383,232 | 5/1968 | Jordan et al. | 106—307 |
| 3,055,856 | 9/1962 | Sutherland | 106—307 XR |
| 3,203,922 | 8/1965 | Hanmer | 106—307 XR |
| 3,247,003 | 4/1966 | Pollock | 106—307 |
| 3,301,694 | 1/1967 | Kraus et al. | 106—307 |
| 3,353,980 | 11/1967 | Johnson | 106—307 |

JAMES E. POER, Primary Examiner

H. M. S. SNEED, Assistant Examiner

U.S. Cl. X.R.

241—5